(No Model.) 2 Sheets—Sheet 1.
J. T. HALSEY.
VALVE FOR ENGINES.
No. 402,922. Patented May 7, 1889.
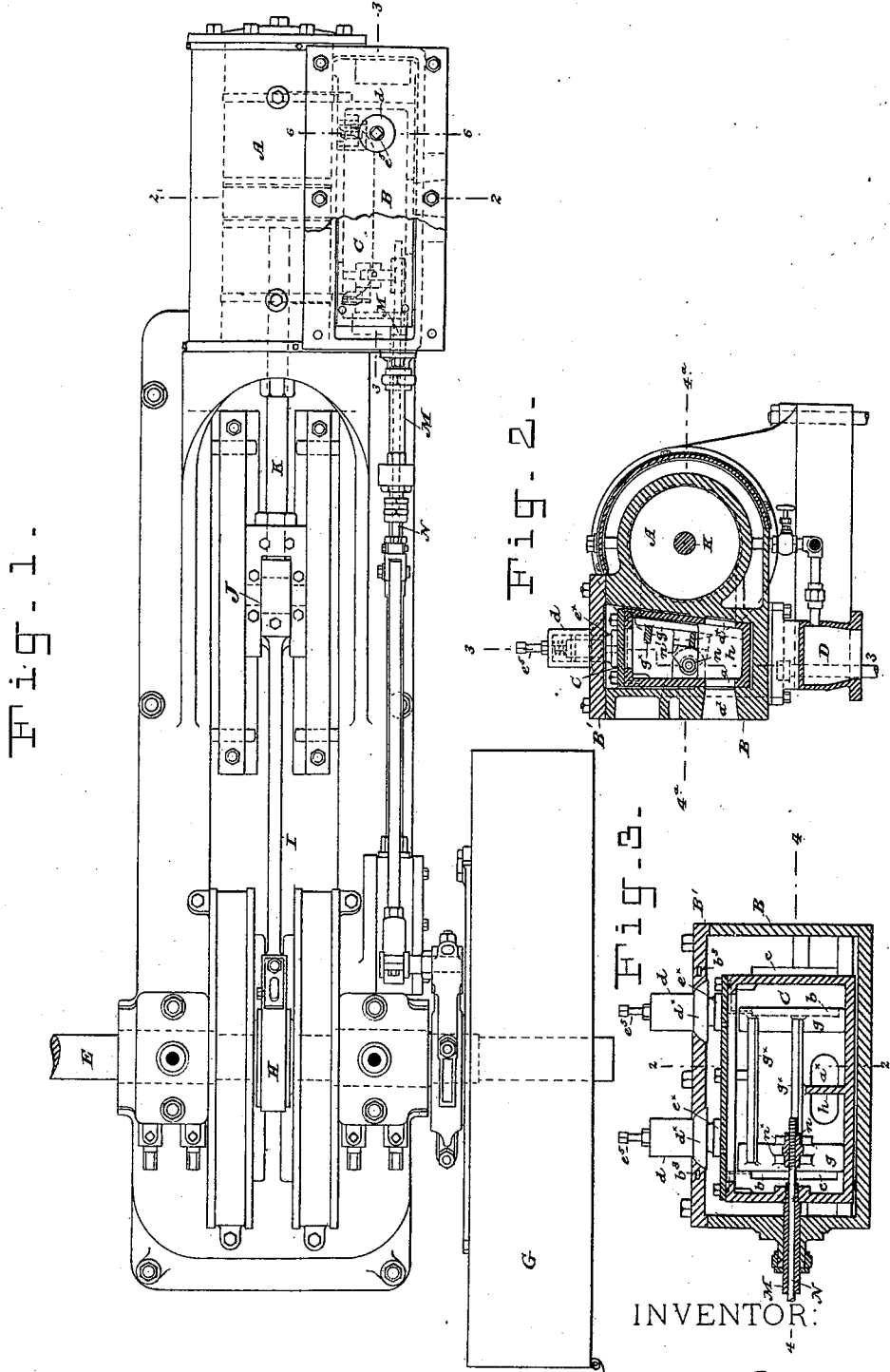
WITNESSES:
INVENTOR:
By
Attorney.

(No Model.) 2 Sheets—Sheet 2.
J. T. HALSEY.
VALVE FOR ENGINES.
No. 402,922. Patented May 7, 1889.
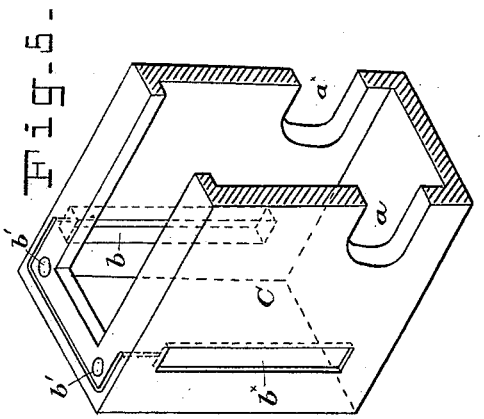
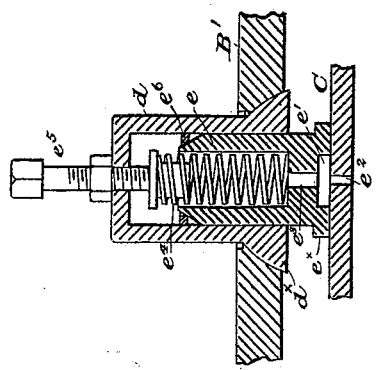
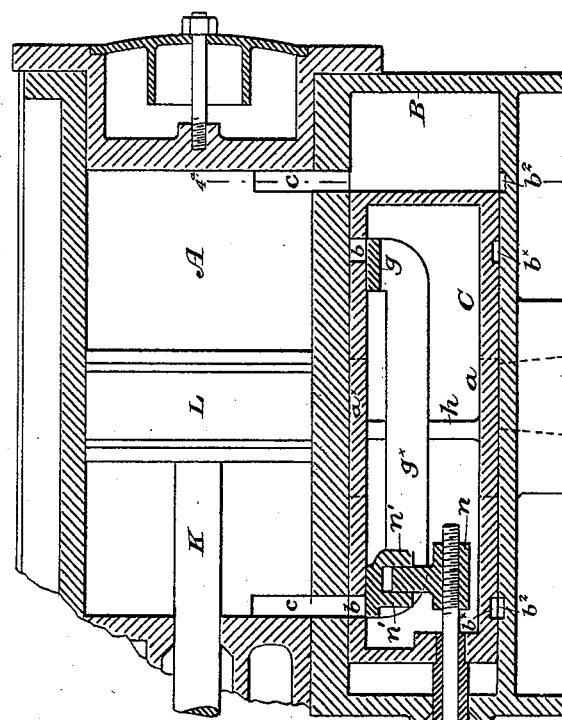
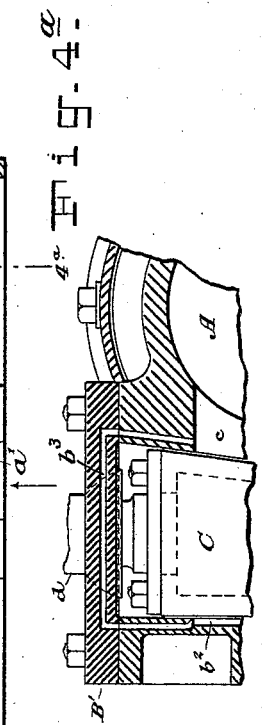
WITNESSES:
INVENTOR:
James T. Halsey.
By Henry Connett
Attorney.

UNITED STATES PATENT OFFICE.

JAMES T. HALSEY, OF PATERSON, NEW JERSEY.

VALVE FOR ENGINES.

SPECIFICATION forming part of Letters Patent No. 402,922, dated May 7, 1889.

Application filed May 15, 1888. Serial No. 273,957. (No model.)

*To all whom it may concern:*

Be it known that I, JAMES T. HALSEY, a citizen of the United States, and a resident of Paterson, in the county of Passaic and State of New Jersey, have invented certain Improvements in Valves for Steam and other Engines, of which the following is a specification.

My invention relates to that class of box-like wedge-shaped valves which are adapted to receive the steam and deliver it through ports in its walls to the ports in the cylinder. In this class of valves the steam is exhausted from the cylinder into the valve-chamber and passes thence to the air or to a condenser.

My invention will be fully described hereinafter, and its novel features carefully defined in the claims.

In the drawings which serve to illustrate my invention, Figure 1 is a plan view of an engine provided with my improvements, a part of the top plate of the valve-chamber being broken away to expose the valve. Fig. 2 is a transverse section substantially on line 2 2 in Fig. 1. Fig. 3 is a longitudinal section substantially on line 3 3 in Fig. 2. Figs. 4, 4ª, 5, and 6 are enlarged detail views that will be hereinafter described.

A represents the engine-cylinder, B the valve-chamber, and C the main box-like valve in said chamber. This valve is made wedge-shaped, as seen in Fig. 2. I prefer to make the incline on the inner face of the valve, or that next the cylinder-wall; but this is not material to my invention. The outer face or both faces of the valve might be inclined. The valve C has an inlet-port, $a$, in its outer face, whereat the boiler-steam enters, said port being elongated and always open to the steam-inlet $a'$ in the outer wall of chamber B. In its inner face the valve has two steam-ports, $b\ b$, which are made to coincide or register alternately with the respective steam-ports $c\ c$ in the cylinder. The chamber B extends the entire length of the cylinder, and indeed beyond the working-space in the cylinder far enough to permit the valve C to play. The ports $c\ c$ are at the ends of the cylinder-bore, and the valve plays over and controls these ports. By this construction I attain the minimum of clearance at the cylinder-ports, this clearance being measured by the thickness of the cylinder-wall only.

In order to balance the lateral pressure on the valve C in all of its positions, I form in the inner face of the valve an aperture, $a^\times$, corresponding in area to the elongated inlet-port $a$ in its outer face, and usually opposite to said port. I also form in the outer face of the valve recesses $b^\times\ b^\times$, each equal in area to a steam-port, $b$, and opposite to said port. This construction is best illustrated in Figs. 4 and 5, the former of which is a horizontal section in the plane of the valve-stem and the latter a perspective view of one-half of the valve C with its top plate removed. Each recess $b^\times$ is connected to its opposite port, $b$, by a closed passage, $b'$, which may be a groove in the top of the valve closed by its top plate, and connecting at its ends with holes extending, respectively, down into the port $b$ and recess $b^\times$. This construction balances the pressure, while the valve-port $b$ and cylinder-port $c$ are in coincidence; but when the valve stands so as to close a port, $c$, there would be an excess of pressure on the face of the valve adjacent to the cylinder. This I counterbalance by the means illustrated in Fig. 4ª, which is a fragmentary transverse section along line 4ª 4ª in Fig. 4. This device comprises recesses $b^2\ b^2$ in the inner face of the outer wall of the valve-chamber B, one opposite to each cylinder-port $c$, and each having the same area as its opposite port. The recess $b^2$ and its opposite port $c$ are connected by a closed passage, $b^3$, (seen best in Fig. 4ª,) formed partly in the top plate, B', of the valve-chamber B and partly in the walls of the chamber.

There is a tendency in a valve of this kind—that is, a wedge-shaped valve—to jump or rise up under certain conditions of compression, which I believe to be due to its form. I obviate this by the means I will now describe.

In the top plate of the valve-chamber B, (see Fig. 6,) I mount a cylinder, $d$, closed at the top and open to said chamber below. In this cylinder plays a piston, $e$, the lower end of which rests on the top plate or crown of the valve C. This piston $e$ has (or may have) a projecting flange, $e^\times$, at its lower end and a hollow, $e'$, underneath it, which always covers a small aperture, $e^2$, in the crown of the valve. This allows the live steam from the interior of the valve C to pass up under said piston and act on the under or lower face of the same to lift it; but the piston has also a longitudinal bore or passage, $e^3$, by which the steam may pass up through it and act on its upper end to press it downward. Now, if the area exposed to the steam-pressure at the upper end of said piston be greater than that subjected to a similar pressure at its lower or inner end, it follows that the pressure tending to force the piston down upon the valve will be equal to this difference of pressures, and may be varied at will by enlarging or reducing the area at the lower end of the piston, the area at the upper end being supposed fixed or constant. It is this difference of steam-pressure on the piston that holds the valve down, and this pressure will vary at all times with the pressure of steam in the valve C. For instance, if there should be a sudden augmentation of the steam-pressure in the valve, which tends to lift it from its seat, the pressure on piston $e$, tending to hold the valve down to its seat, will be correspondingly augmented. The flange $e^x$ on the piston is merely designed to give the proper surface to form a seat for the piston on the moving valve. I have shown a spring, $e^4$, arranged over the piston to hold it down, and a screw, $e^5$, in the top of cylinder $d$ for varying the tension of said spring. This spring is only designed to hold the piston down to its seat when no steam is on. It will not have any appreciable effect when the valve is in operation and the engine under steam.

The recess or hollow $e'$ in the lower end of piston $e$ may be elongated, so as to allow it to always house and cover the steam-inlet aperture $e^2$ and yet have a moderately small area. In order that the piston may seat itself properly on the crown of the valve, even though all the parts are not exactly aligned and fitted, I prefer to secure the cylinder $d$ in the top plate of chamber B by a sort of ball-and-socket joint—that is to say, the flanged base $d^x$ of the cylinder is turned to a parti-spherical form and fitted into a corresponding recess in the top plate, as clearly shown in Fig. 6. When there is no steam in the engine, the spring $e^4$ will serve by its reaction to hold said base $d^x$ up to its seat.

As a packing for the piston $e$, (see Fig. 6,) I cone its upper end and mount on it a packing-ring, $e^6$, the inner lower corner of which bears on the inclined outer face of the piston, the outer face of the ring bearing on the inner face of the cylinder $d$. The pressure of the steam on said ring keeps it pressed up tightly against both the cylinder and the valve, and the tightness of the packing will vary with the pressure of the steam. I have described but one of these devices for holding down the valve; but in order to better steady a long valve, I usually employ two like devices, as shown in Fig. 3. Any number may be employed; but two will usually suffice.

The steam escapes from cylinder A into the valve-chamber B when the valve C uncovers the port from which the exhaust-steam issues, and said exhaust passes off through the exhaust-pipe D. (Seen in Fig. 2.) This exhaust-pipe is capacious and is arranged directly under the valve-chamber, and the openings from the chamber lead directly down into the exhaust-pipe, whereby the exhaust has a short and unobstructed path from the cylinder into said pipe at each end of the chamber as soon as the valve uncovers the port.

In Fig. 1, E represents the main shaft of the engine; G, the fly-wheel thereon; H, the crank; I, the connecting-rod; J, the crosshead, and K the piston-rod coupled to the piston L. (Seen in dotted lines.) These parts may be of the usual kind, and form no part of my present invention.

The main valve C is coupled to the eccentric through the medium of a tubular valve-stem, M, in any convenient manner. This also forms no part of my present invention. My main valve C is, however, provided with a cut-off valve, which I will now describe, premising that one feature of this latter valve is its limited surface exposed to the pressure of the steam. The stem N of the cut-off valve plays through the tubular stem M of the main valve. This stem N is provided with nut $n$, which has a flange on it that plays between guides $n'$ on the back of the cut-off valve, as seen in Fig. 4. This nut allows of the adjustment of the cut-off valve with respect to the main valve, and the loose connection of the nut with the cut-off valve permits the said valve to seat itself on the main valve properly at all times.

The cut-off valve itself comprises two plates, $g\ g$, which play over the ports $b\ b$, respectively. These plates are connected by ties $g^x\ g^x$, which stand up from the valve-seats. Thus the area subjected to steam-pressure is limited to the area of plates $g\ g$. A tie or strengthening-web, $h$, connects the two faces of the main valve C below the lower tie, $g^x$, of the cut-off valve.

I have not fully illustrated the means I employ for imparting the proper motion to the cut-off valve, as any known mechanism may be used for the purpose. The special mechanism I employ will form the subject of another application. The port $b$ and opposite recess, $b^x$, may be connected in any convenient manner by a steam-passage.

Fig. 6 is only an enlarged view of the device for keeping the valve C down to its seat. This device is shown *in situ* in Fig. 3.

As the valve-chamber B is not open to the boiler-steam and the top plate or cover, B', of same is not employed as an intermediate for the attachment of either the exhaust or inlet steam-pipes, it may be readily removed for the inspection of the valve, even when the steam is on, provided the ports are closed by the valve.

The device illustrated in Fig. 6 is in the nature of a proportionate pressure regulator or governor, as it regulates the pressure on the valve and proportions it at all times to the pressure of the live steam. Its construction may be varied considerably without departing materially from my invention.

My improvements may be applied to all classes and kinds of engines, and is not limited to that class shown herein.

Having thus described my invention, I claim—

1. The combination of a wedge-shaped valve-chamber open to the exhaust at its bottom and at both ends, and forming a part of the way or passage for the same, and a box-like wedged-shaped valve arranged to play in said valve-chamber, said valve being constantly open to the live steam through a port in the wall of the valve-chamber, and being provided with the usual steam-ports for admitting steam alternately to the ends of the engine-cylinder, as set forth.

2. The combination of a wedge-shaped valve-chamber open to the exhaust at its bottom and at both ends, and forming a part of the way or passage for the same, and a box-like wedge-shaped valve arranged to play in said valve-chamber, said valve being constantly open to the live steam through a port in its lateral face opposite to the engine-cylinder only, said port coinciding with a port in the outer wall of the valve-chamber, and said valve being provided with the usual steam-ports in its opposite lateral face only for admitting steam alternately to the ends of the engine-cylinder, as set forth.

3. The combination of a wedge-shaped valve-chamber open to the exhaust at its bottom and at both ends, a box-like wedge-shaped ported valve arranged to play in said valve-chamber and always open to the live steam, and means, substantially as described, for applying a proportionate or differential pressure upon said valve to hold it down to its seat.

4. The combination, with the wedge-shaped valve-chamber open to the exhaust and having ports leading direct into the ends of the cylinder, of the wedge-shaped main valve constructed to fit and play in said chamber, said valve having a port always open to the live-steam inlet, and ports for the admission of steam to the cylinder from said valve, and a cut-off valve mounted in the wedge-shaped main valve and controlling the passage of steam from the latter valve to the cylinder, substantially as set forth.

5. The combination, with the valve-chamber and its box-like wedge-shaped valve, of a pressure-regulator arranged over said valve and comprising a foot resting on the crown of the valve, and a steam-chamber behind said foot open to the live steam, whereby the pressure of the foot on the valve is regulated by and proportioned to the pressure of the live steam within the valve at all times, as set forth.

6. The combination, with the valve-chamber open to the exhaust at its bottom and at both ends, of the wedge-shaped valve therein, open at one side only to the live steam, and having ports in its opposite face only for communication with the cylinder, said chamber having recesses $b^2$ in the inner face of its outer wall connected by steam-passages with the respective steam-ports in the cylinder, whereby the pressure on the one face of the valve is balanced by the pressure on the opposite face thereof.

7. The combination, with the valve-chamber, of the wedge-shaped valve therein always open to the live steam, said valve having steam-ports in its wall adjacent to the cylinder, and having also recesses in the outer face of its opposite wall, said ports and recesses being connected, respectively, by steam-passages, whereby the pressure is approximately balanced on the opposite faces of valve.

8. The combination, with the wedge-shaped valve-chamber, constantly open to the exhaust and provided with ports opening into the cylinder, of the wedge-shaped main valve, always open to the live-steam inlet and provided with ports $b\ b$ to admit steam to the cylinder in one of its faces, recesses $b^\times\ b^\times$, substantially equal in area to said ports in the outer face of its opposite wall, and steam-passages $b'$, connecting said ports $b$ and recesses $b^\times$, substantially as set forth.

9. The combination of the valve-chamber B, open to the exhaust and provided with a steam-inlet, $a'$, ports $c\ c$, opening into the cylinder, and recesses $b^2\ b^2$ in the inner face of its outer wall opposite to and substantially equal in area to the ports $c\ c$, and connected with said ports, respectively, by closed steam-passages, and the wedge-shaped main valve C, having openings $a\ a^\times$ in its opposite walls of substantially equal area, ports $b\ b$ in its inner wall, recesses $b^\times\ b^\times$ in the outer face of its outer wall equal in area to said ports, and closed steam-passages connecting recesses $b^\times$ with ports $b$, substantially as set forth.

10. The combination, with the valve-chamber and the wedge-shaped main valve therein, of the cylinder $d$, mounted in said chamber over said valve, and the piston $e$ in said cylinder seated on said valve, said piston $e$ having a recess, $e'$, always open to the interior of the valve, and a longitudinal passage, $e^3$, connecting the recess $e'$ with cylinder $d$ above said piston, substantially as set forth.

11. The combination, with the valve-chamber and the wedge-shaped main valve therein, of a cylinder, as $d$, mounted on said valve-chamber and always open at its upper part to the boiler-steam, and the piston, as $e$, in said cylinder, its lower end seated on said main valve, said piston having a recess, as $e'$, in its lower face, always open to the live steam, the area of the recess $e'$ being less than the area of the upper end of the piston, substantially as and for the purpose set forth.

12. The combination, with the valve-chamber and the wedge-shaped main valve therein, of the cylinder $d$, provided with a partispherical base, $d^\times$, seated in a recess in the top plate of said chamber, and the piston $e$ in said cylinder and seated on said valve, said piston having a recess, $e'$, always open to the steam in the valve, and a passage, $e^3$, connecting said recess with the cylinder $d$ above said piston, substantially as set forth.

13. The combination, with the valve-chamber and the wedge-shaped main valve therein, of the cylinder $d$ on said chamber, the piston $e$ therein, provided with a recess, $e'$, and passage $e^3$, and seated on said valve over aperture $e^2$, the spring $e^4$ in said cylinder behind the piston, and the screw for varying the tension of the spring, substantially as set forth.

14. The combination, with the cylinder $d$ and the hollow or tubular piston $e$ therein, said piston being coned at the top, as described, of the packing-ring $e^6$, mounted on the coned part of said piston and bearing outwardly against the cylinder-wall, as set forth.

In witness whereof I have hereunto signed my name in the presence of two subscribing witnesses.

JAMES T. HALSEY.

Witnesses:
HENRY CONNETT,
J. D. CAPLINGER.